July 11, 1967 HIKORO KOSEKI 3,330,912
TELEPHONE SYSTEM
Filed Jan. 3, 1964
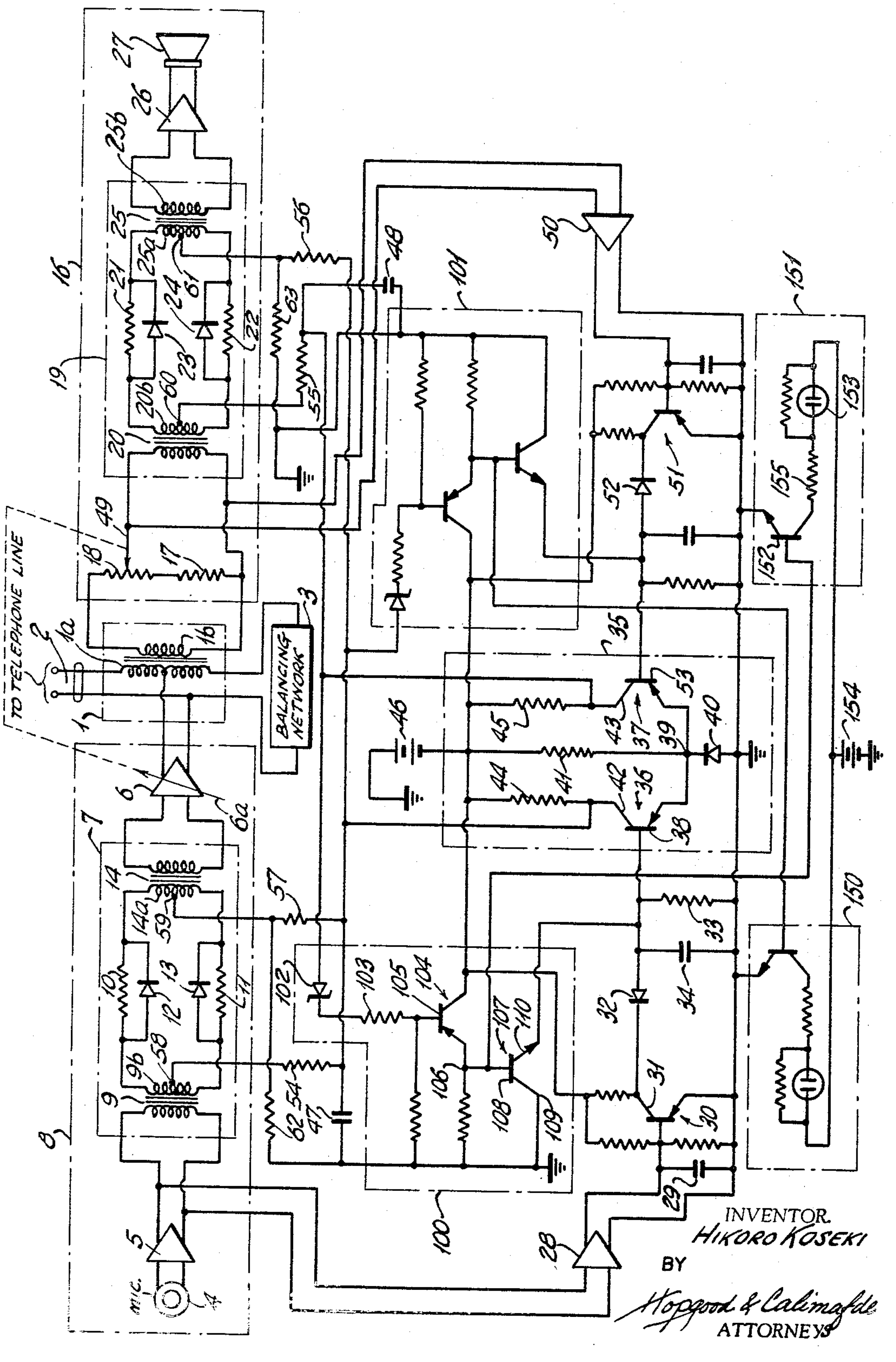
INVENTOR.
HIKORO KOSEKI
BY
Hopgood & Calimafde
ATTORNEYS United States Patent Office 3,330,912

Patented July 11, 1967

3,330,912

TELEPHONE SYSTEM

Hikoro Koseki, Tokyo, Japan, assignor to Nippon Electric Company Limited, Tokyo, Japan, a corporation of Japan Filed Jan. 3, 1964, Ser. No. 335,554
6 Claims. (Cl. 179—81)

This invention relates to a loud-speaker telephone system and more particularly to such a system in which a voice switching arrangement is employed.

In prior art telephone systems of this type, numerous difficulties are encountered. These include clipping of speech syllables due to the operating time lag of control circuits, the occurrence of "singing" accompanied by insufficiency of side tone loss of the hybrid coil due to transients produced when making telephone exchange connections to various telephone lines, the blocking of speech signals due to ambient noise, and the unnaturalness of conversation due to the difference of voice levels when switching during short haul calls.

Accordingly, it is an object of this invention to provide an improved telephone system or instrument which eliminates the above disadvantages.

A further object of the invention is to substantially improve the naturalness of speech in a telephone system and also to minimize disturbance resulting from ambient noise.

Briefly, the invention contemplates an improved telephone system wherein "singing" is eliminated by supplementing the insufficiency of the side tone loss of a hybrid coil, the line loss and the acoustic loss, with a predetermined additional loss during the absence of speech signals, the normal gain of the system being maintained during the presence of speech signals.

In accordance with one embodiment of the invention there is provided a loud-speaker telephone instrument, in which semiconductors are used as components, and which has a transmitting system or channel which comprises a microphone, a transmitting amplifier and a transmitting variable attenuator, the system being connected to a two-wire telephone line through a conventional hybrid coil with a balancing network. This embodiment further includes a receiving system or channel which comprises a receiving variable attenuator, a receiving amplifier and a speaker. The receiving system is also connected to the two-wire telephone line through the hybrid coil. The transmitting and receiving variable attenuators include diodes which have forward resistance values that change in accordance with the magnitude of D.C. currents applied to them from suitable control circuits.

The attenuators have the same form in both the transmitting and receiving systems and are connected to operate reciprocally. This is achieved with the aid of the diodes which form part of the attenuator circuits. For reciprocal operation, these diodes are connected differently in the transmitting and receiving attenuators so that when the loss is caused to diminish through one attenuator, it is caused to increase through the other attenuator. This is accomplished by means of switching action during which conduction of the diodes is varied. The D.C. current which is employed to control the conduction of the diodes, is derived from a voltage comparator, which forms part of a control circuit and is operated by a portion of the speech signal from the transmitting and receiving channels.

The voltage comparator produces a voltage which is related to the magnitudes of the signals from the transmitting and receiving channels, and preferably takes the form of a two transistor differential amplifier of the common emitter connection type. The emitter electrodes are connected to a silicon diode, a terminal of which is grounded, the emitter voltage of each transistor being fixed by the forward voltage drop of this diode. A rectified portion of the signal from one channel is fed to the base of one transistor and a rectified portion of the signal from the other channel is fed to the base of the other transistor. A voltage is obtained between the collector electrodes which is related to the difference of the magnitudes of the input signals to the base electrodes. A capacitor is connected between each collector electrode and ground to reduce voice fluctuation during switching. In order to prevent operation of the comparison circuit due to the ambient noise level, a filter circuit including a resistor and a capacitor is provided for each channel between the point in each channel from which a portion of the speech signal is derived and the input of the comparison circuit for that channel. This improves the quality of voice transmission.

A switching hold circuit is also provided between the collector electrode of each differential amplifier transistor and the base of the other differential amplifier transistor. These switching circuits operate in response to changes in the potentials at the transistor collector electrodes so that each transistor of the comparator circuit may pass or block the signal applied to the base of the other comparator transistor at appropriate times.

The invention may also include visual indicating means associated with the transmitting channel and similar means associated with the receiving channel so that the operation of the condition of the voice switch can be directly observed. For this purpose switching transistors are provided in each visual indicating means circuit, which operate in response to level variations of the comparator transistor collector voltages according to the presence or absence of a signal to the comparison circuit. The emitters of these switching transistors are grounded and the collectors are connected to a D.C. power source of sufficient voltage to light a visual indicating lamp.

All of the objects, features and advantages of the invention and the manner of attaining them will become more apparent and the invention itself will be best understood by reference to the following description taken in conjunction with the accompanying drawing which shows one embodiment of a telephone system in accordance with the principles of the invention.

Referring now to the drawing, there is shown a loud speaking telephone system according to the invention which is connected to a conventional telephone line by means of terminals 2 of a hybrid coil 1. To one winding *1a* of the hybrid coil 1 a balancing network 3 is connected, which has a value related to the impedance seen in the telephone line from the terminals 2. The winding *1a* of the hybrid coil 1 is connected to a transmitting system or channel 8 which comprises a microphone 4, an amplifier 5 having a fixed gain, an amplifier 6 having a manually controllable gain adjustment (indicated by the arrow *6a*) and a transmitting variable attenuator 7. The output of the amplifier 5 is connected to the hybrid coil 1 through the attenuator 7 and the amplifier 6. This attenuator 7 includes diodes 12 and 13, bridged by resistors 10 and 11 respectively, and connected in series with the secondary winding *9b* of a transformer 9 and the primary winding *14a* of a transformer 14. The amplifier 6, which is connected to the transformer 14, is designed to have a sufficient gain for a short haul call, even when the gain control is at its minimum setting.

The other winding *1b* of the hybrid coil 1 is connected to a receiving system or channel 16. The receiving channel 16 comprises a fixed resistor 17 in series with a potentiometer 18 connected across the hybrid coil winding *1b*, a receiving variable attenuator 19, and an amplifier 26 having a fixed gain and a speaker 27. The receiving variable attenuator 19 is similar to the transmitting variable attenuator 7 and includes diodes 23 and 24 bridged respectively by resistors 21 and 22, and connected in series with the secondary winding 20b of a transformer 20 and the primary winding 25a of a transformer 25.

The secondary 25b of the transformer 25 is connected to the amplifier 26, which is connected to the speaker 27 for reproducing received speech signals. The potentiometer 18 is ganged to the gain control on the amplifier 6, and operates to vary the level of the reproduced signal.

In the transmitting system 8, a portion of the transmitting signals between the amplifier 5 and the attenuator 7 is fed to a low frequency suppression control amplifier 28. At the output side of the amplifier 28 a capacitor 29 is provided for suppressing the higher frequencies and for preventing improper functioning of the next circuit stage due to excessive input signal level. The lower plate of the capacitor 29 is grounded and the upper plate is fed to an emitter-grounded type PNP transistor 30 which comprises a D.C. amplifier. To the collector 31 of this transistor a rectifier diode 32 is connected, its output being connected to a parallel circuit comprising a resistor 33 and a capacitor 34 for filtering and level setting functions. The diode 32 is also connected to a voltage comparator in the form of a differential amplifier 35. This amplifier 35 is of the emitter-grounded type and includes two electron flow devices, which may be in the form of PNP transistors 36 and 37. The emitters of the transistors 36 and 37 are connected together at the junction 39 to one terminal of a silicon diode 40 which has its other terminal grounded, and to one terminal of a biasing resistor 41 which has its other terminal connected to a D.C. source 46. The collectors 42 and 43 of the transistors 36 and 37 are connected to resistors 44 and 45, respectively, the other terminal of each of these resistors being connected to one terminal of the D.C. source 46. The other terminal of the source 46 is grounded. Capacitors 47 and 48, which serve filtering and delaying functions, are connected respectively, between the collectors 42, 43 and ground.

A circuiit similar to that connected to the output of the transmitting amplifier 5 is connected to the receiver system 16. Thus the signal at the terminal 49 of the potentiometer 18 is fed to an amplifier 50 corresponding to the amplifier 28, through a transistor 51 corresponding to the transistor 30, and through a diode 52 corresponding to the diode 32 to the base 53 of the transistor 37. Concerning the received signal level at the terminal 49, for the minimum and maximum resistance values of the potentiometer 18, the gains of the amplifiers 26 and 50 are selected so that the volume from the speaker 27 provides a satisfactory level and so that the transistor 37 of the differential amplifier 35 performs satisfactorily for both the shortest haul call and the longest toll call, as will appear.

The collectors of the transistors 36 and 37 in the differential amplifier 35 are connected, respectively, to resistors 54, 57 and 55, 56 to the center taps 58, 59 and 60, 61 of the transformers 9, 14 and 20, 25 of the transmitting and receiving attenuators 7 and 19, respectively. It will be seen that the diodes in the different attenuators 7 and 19 are connected in opposite relationship with respect to each collector 42 and 43 of the transistors 36 and 37. For setting the level of the attenuators 7 and 19 to the waiting state, resistors 62 and 63, each having one terminal grounded, are connected to the center taps 59 and 61 respectively, of the transformers 14 and 25.

When there is no input signal in either of the transmitting or receiving systems 8 and 16, the transistors 36 and 37 of the differential amplifier 35 are inoperative, and consequentially the potential at each collector 42 and 43 with respect to ground is approximately equal to the voltage of the D.C. biasing source 46. Accordingly, under such conditions, the potential difference between the collectors 42 and 43 is zero. However, since the center tap points 59 and 61 of the transformers 14 and 25 are grounded through the resistors 62 and 63 respectively, the points 59 and 61 have a slightly positive potential with respect to the center tap points 58 and 60 of the transformers 9 and 20. These potentials bias the diodes in each attenuator 7 and 19 in the reverse direction, so that each attenuator in such condition provides a loss, and thus the output signals therefrom are smaller than the input signals. This loss is usually selected to be approximately 35–45 db of the level of the transmitting and receiving signals.

In order to either transmit or receive a call with minimum loss of no-signal or waiting time, it is merely necessary to effectively change the connection of the resistor 62 to the center tap 58 of the transformer 9 in the transmitting system 8, and to change the connection of the resistor 63 to the center tap 60 of the transformer 20 in the receiving system 16. When there exist large ambient noises on the transmitting end, in order to diminish the unnaturalness due to the signal delivery difference of the attenuator to the opposite subscriber, the transmitting system should provide a minimum loss at the time of no signal. In such case the resistor 63 can be eliminated.

When there are signals at the transmitting end, the output of the microphone 4 is, of course, increased by the amplifier 5, and a portion of output of the amplifier 5 is fed to the amplifier 28. The low frequency components of the output from the amplifier 28 are suppressed, and this signal is then passed through the transistor 30, rectified by the diode 32, filtered by the resistor-capacitor combination 33–34, the resulting signal being fed to the base 38 of the transistor 36. For a base input signal level only moderately greater than the voltage at the emitter, the voltage at the collector 42 sharply increases to a value approximately equal to the emitter voltage. This causes the center tap 58 of the transformer 9 in the transmitting attenuator 7 to become positive with respect to the center tap 59 of the transformer 14, and the diodes 12 and 13 are thereby biased in a forward direction, so that minimum loss is then provided by the attenuator 7. On the other hand, the receiving attenuator 19 operates so that it provides the maximum loss reciprocally with the transmitting attenuator 7. The manner of operation of the receiving attenuator 19 and its related circuitry when there exist input signals to the receiving system will be obvious in the light of the foregoing description of operation of the transmitter attenuator 7.

In further accordance with the invention, switching hold circuits 100 and 101 are also provided to prevent one channel from operating due to low acoustic attenuation between a speaker and a microphone or due to the low side-tone attenuation of a hybrid coil, when the other channel is operating. Both of the switching circuits 100 and 101 are of the same form. The input of the switching hold circuit 100 for the receiver end or channel is connected from the collector 43 of the transistor 37 in the differential amplifier 35, the output being connected to the base 38 of the other differential amplifier transistor 36 so that this latter transistor can be rendered inoperative as required. Similarly, the input of the switching hold circuit 101 at the transmitting end or channel is connected from the collector 42 of the transistor 36, its output being connected to the base 53 of the transistor 37 to render it inoperative.

In the hold circuit 100, a Zener diode 102 and a resistor 103 are connected in series between the collector 43 of the transistor 37 and the base 105 of a collector grounded PNP transistor 104. The Zener voltage of the Zener diode 102 is selected to be a value lower than the collector voltage when the transistor 37 is cut-off. Consequently, when there exists no input signal to the receiver channel, the potential of the base 105 becomes negative so that the transistor 104 conducts. The base of a NPN transistor 107 is connected to the emitter of the transistor 104, its collector 109 being grounded and the emitter 110 being connected to the base 38 of the transistor 36 of the differential amplifier 35. During the absence of an input signal to the receiver channel 16, the base 108 of the transistor 107 has a negative potential, and consequently a high impedance exists between the collector 109 and the emitter 110. However, when signals exist at the receiver channel input, the voltage at the collector 43 of the transistor 37 changes, and the negative potential supplied to the base 105 of the transistor 104 is suppressed by the Zener diode 102 so that the transistor 104 becomes cut off. Consequently, the transistor 107 conducts and the potential of the emitter 110 is applied to base 38 of the transistor 36 causing it to approach earth potential, rendering this transistor inoperative so that the signals from the transmitting system cannot pass therethrough. If the circuit constants are selected so as not to render the transistor 36 totally non-conductive, it will be appreciated that change-over from the receiving to the transmitting state can be achieved by a sufficiently large input from the amplifier 5 of the transmitting system. The manner of operation of the switching hold circuit 101 is the same as that of the switching hold circuit 100 just described.

The invention may also include visual indicating means such as the circuits 150 and 151 for indicating when the transmitting channel and the receiving channel are in operation. The input of the visual indicating circuit 151 for the receiver system is obtained from the emitter 106 to the transistor 104 in the receiver switching hold circuit 100. This is connected to the base of an NPN transistor 152, the emitter thereof being grounded, and the collector being connected to one terminal of a visual indicating lamp 153 through a resistor 155. The other terminal of the lamp 153 is connected to the positive side of a D.C. source 154, which has a voltage sufficient to light the visual indicating lamp. In the absence of an input signal to the receiver channel 16, the transistor 152 is cut off, so that the visual indicating lamp 153 does not light; when such an input signal does exist, the transistor 152 conducts, causing the visual indicating lamp 153 to light. The indicating circuit 150 for the transmtiting channel 8 is identical to that for the receiving channel 16.

An alternative visual indicating circuit arrangement could employ a blocking oscillator or a D.C. to D.C. converter circuit to operate in response to a potential difference between the collectors of the two transistors in the comparison circuit 35. A still further alternative arrangement could employ merely a diode in series with the visual indicating lamp connected to the comparison circuit output providing, of course, that such output is sufficient in amplitude to light the lamp.

It should be noted that the volume from the speaker 27 in the receiving channel 16 can also be controlled by means of a variable resistor gain control at the receiving channel input terminals connected so that the input to the control circuit can be simultaneously regulated. Such an arrangement would insure no interference from another call during a short haul call. Additionally, this variable resistor which regulates the receiving gain may advantageously be ganged to the amplifiers in the transmitting channel. Thus, for example, in the transmitting system described a double-interlocking variable resistor could be used. This permits adjustment of the transmitting output in a manner similar to that of the receiving channel and operates to more drastically decrease the level variations with the transmitting switching operation in a short haul call. Its variable limits can be determined from the transmitting and receiving signal levels to ensure good speaking quality for both the shortest haul call or the longest toll call.

This invention provides a number of important advantages. Among these are that the telephone system of the invention is simpler than comparable prior art arrangements. Additionally it permits transmission of calls without impairment of the speaking quality. Stated in another manner, the fidelity of transmission is substantially improved.

Also, in the transmitting and receiving channels of the invention, variable attenuators having the same form in both channels are included, each of them comprising semiconductor elements for altering the A.C. impedance of the attenuator in accordance with a D.C. potential applied, to vary the gain of each channel. Their transmitting and receiving attenuation can be independently set, they are connected reciprocally, and their D.C. control currents also flow independently through the D.C. paths therein under the same conditions. As a result very stable operation is achieved.

Additionally, the D.C. potential for controlling the semiconductors in the variable attenuator circuits are indirectly derived from a comparison circuit which operates in response to the speech signal derived from a portion of the transmitting and receiving channels. This comparison circuit constitutes a common emitter type differential amplifier and the voltage of the emitters of the transistors in this circuit is fixed by utilizing the forward voltage drop of a silicon diode to thereby achieve very rapid differential amplifier action. This prevents clipping of the voice signals, thus improving the quality of transmission.

Furthermore, in accordance with the invention operation of the switching hold circuits is assured, since the output of each of these circuits is connected to the input of the alternate one of the two transistors comprising the differential amplifier.

Still further, the ganged or interlocking operation of the transmitting and receiving channels allows compensation for the different levels of speech signals resulting from the switching operation for a short haul call, increases its naturalness, and controls the volume from the speaker. It further insures proper operation of the control circuit by controlling the input level thereto.

It will be appreciated that the control circuit is designed to operate in the voice frequency band in a manner whereby the ambient noise is diminished.

Finally, the invention provides visual indicating lamps for indicating the operating condition of the transmitting and receiving channels by utilizing the collector voltage variations of the transistors which constitute the differential amplifier While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A telephone system comprising
a transmitting channel including a microphone, an amplifier and a first variable attenuator,
a receiving channel coupled to said transmitting channel and including an amplifier, a second variable attenuator and a loud speaker, said second variable attenuator having substantially the same form as said first attenuator,
a voltage comparator having first and second input terminals and first and second output terminals, said voltage comparator including a first electron flow device connected between said first input and output terminals and a second electron flow device connected between said second input and output terminals,
first means for coupling signals from said microphone to said first input terminal,
second means for coupling signals from the input of said receiving channel to said second input terminal,
means connecting said first output terminal to said first attenuator and means connecting said second output terminal to said second attenuator,
a first switching circuit connected between said first output terminal and said second input terminal, said first switching circuit being responsive to a predetermined potential at said first output terminal to block the input signal applied to said second input terminal, and a second switching circuit connected between said second output terminal and said first input terminal, said second switching circuit being responsive to a predetermined potential at said second output terminal to block the input signal applied to said first input terminal, said first variable attenuator comprising first and second transformers, attenuating elements between the secondary of the first transformer and the primary of the second transformer;

at least one unidirectional semiconductor current means in parallel across each of said attenuating elements to shunt said elements when in the flow state;

first biasing connection means connected to the center of the secondary of the first transformer and the center of the primary of the second transformer;

said second variable attenuator comprising third and fourth transformers, attenuating elements between the secondary of the third transformer and the primary of the fourth transformer;

at least one unidirectional semiconductor current means in parallel across each of said attenuating elements to shunt said elements when in the flow state;

second biasing connection means connected to the center of the secondary of the third transformer and the center of the primary of the fourth transformer;

said first and second output terminals being connected respectively to said first and second biasing connection means, said unidirectional semiconductor current means being poled in opposite directions to react oppositely to changes at said output terminals.

2. The invention described in claim 1 wherein each of said first and second means includes a low frequency suppression amplifier, a D.C. amplifier and a rectifier circuit.

3. The invention described in claim 1 wherein said voltage comparator comprises a differential amplifier.

4. The invention described in claim 1 wherein said electron flow devices comprise a pair of transistors connected in common emitter relationship.

5. The invention described in claim 1 which further includes indicating means responsive to a change in potential at one of said output terminals for indicating the operational state of said transmitting channel, and indicating means responsive to a change in potential at the other of said output terminals for indicating the operational state of said receiving channel.

6. A telephone system comprising a transmitting channel including a microphone, an amplifier and a first variable attenuator, said attenuator including at least one diode, a receiving channel coupled to said transmitting channel and including an amplifier, a second variable attenuator and a loudspeaker, said second variable attenuator having substantially the same form as said first attenuator, said second attenuator also including at least one diode, a differential amplifier having first and second input terminals and first and second output terminals, said differential amplifier including a first transistor connected between said first input and output terminals and a second transistor connected between said second input and output terminals, an amplifier and a rectifier coupling a signal from said microphone to said first input terminal on said differential amplifier, an amplifier and a rectifier coupling a signal from the input of said receiving channel to said second input terminal on said differential amplifier, means connecting said first output terminal to said first attenuator to bias the diode therein so that said first attenuator introduces a predetermined amount of loss into said transmitting channel when the potential at said first output terminal has a predetermined value, means connecting said second output terminal to said second attenuator to bias the diode therein so that said second attenuator introduces a predetermined amount of loss into said receiving channel when the potential at said output terminal has a predetermined value, the conduction of said diodes being caused to change in response to changes from said predetermined potentials at said output terminals whereby changes in the losses introduced by said attenuators is produced in said channels, a first switching hold circuit connected between said first output terminal and said second input terminal, said first switching hold circuit being responsive to a predetermined potential at said first output terminal to block the input signal applied to said second input terminal, and a second switching hold circuit connected between said second output terminal and said first input terminal, said second switching hold circuit being responsive to a predetermined potential at said second output terminal to block the input signal applied to said first input terminal.

References Cited

UNITED STATES PATENTS

| | | | |
|---|---|---|---|
| 2,468,553 | 4/1949 | Herrick | 179—170.8 |
| 2,696,529 | 12/1954 | Bachelet | 179—170.8 |
| 3,113,181 | 12/1963 | Soderbaum | 179—170.8 X |
| 3,146,313 | 8/1964 | Ulin | 179—1 X |
| 3,182,137 | 5/1965 | Beatty | 179—170.8 |
| 3,275,759 | 9/1966 | Brady | 179—170.8 |

KATHLEEN H. CLAFFY, *Primary Examiner.*

R. P. TAYLOR, *Assistant Examiner.*